United States Patent [19]

Meinig

[11] Patent Number: 4,865,365
[45] Date of Patent: * Sep. 12, 1989

[54] AIR DUCT SECTION HAVING A CONNECTING FLANGE FORMED BY BENDING UP THE ENDS OF THE AIR DUCT WALLS

[75] Inventor: Manfred Meinig, Rietheim-Weilheim, Fed. Rep. of Germany

[73] Assignee: Metu-System Meinig KG, Reitheim-Weilheim, Fed. Rep. of Germany

[ * ] Notice: The portion of the term of this patent subsequent to Apr. 26, 2005 has been disclaimed.

[21] Appl. No.: 177,049

[22] Filed: Apr. 4, 1988

Related U.S. Application Data

[63] Continuation-in-part of Ser. No. 847,170, Apr. 2, 1986, Pat. No. 4,739,802.

Foreign Application Priority Data

Jun. 4, 1985 [DE] Fed. Rep. of Germany ....... 3512669

[51] Int. Cl.⁴ .............................................. F16L 23/00
[52] U.S. Cl. ..................................... 285/412; 285/406; 285/405; 285/424; 138/155; 138/109; 138/DIG. 10

[58] Field of Search ............... 285/363, 364, 368, 405, 285/406, 412, 424; 138/109, 155, DIG. 4, DIG. 10, 177, 178, 120

[56] References Cited

U.S. PATENT DOCUMENTS

| | | | |
|---|---|---|---|
| 3,170,544 | 2/1965 | Kinkead et al. | 285/424 |
| 4,252,350 | 2/1981 | Smitka | 285/363 |
| 4,304,423 | 12/1981 | Mez | 285/405 |
| 4,542,923 | 9/1985 | LaCrosse et al. | 285/364 |
| 4,564,227 | 1/1986 | Murck | 285/364 |
| 4,566,724 | 1/1986 | Arnoldt et al. | 285/364 |
| 4,579,375 | 4/1986 | Fischer et al. | 285/364 |
| 4,739,802 | 4/1988 | Meinig | 285/405 |

FOREIGN PATENT DOCUMENTS

3638618 5/1987 Fed. Rep. of Germany ...... 285/363

Primary Examiner—Randolph A. Reese
Assistant Examiner—Anthony Knight
Attorney, Agent, or Firm—Leonard Bloom

[57] ABSTRACT

The end of a duct section having flat sheet metal plates is bent up to form connecting flanges having an essentially hollow closed profile. Flange walls of the connecting flanges bearing the free edges of the duct section are lock-seamed into folding pockets which are formed between the duct wall and the adjoining flange wall. To connect duct sections having larger duct cross-sections, the flange walls can have outwardly extending protrusions for reinforcement.

40 Claims, 5 Drawing Sheets

AIR DUCT SECTION HAVING A CONNECTING FLANGE FORMED BY BENDING UP THE ENDS OF THE AIR DUCT WALLS

CROSS REFERENCE TO RELATED APPLICATION

The present application constitutes a continuation-in-part of application Ser. No. 847,170 filed Apr. 2, 1986, now U.S. Pat. No. 4,739,802, the disclosure of which is incorporated herein by it entirety.

FIELD OF THE INVENTION

The invention concerns an air duct section comprising flat duct walls made of sheet metal and having a connecting flange formed by bending up the ends of the duct section walls.

BACKGROUND OF THE INVENTION

The connecting flange can thereby have a hollow closed profile, shaped in any way, whose individual flange walls extend straight or angled in a sectional view. Most of the time, the hollow profile of the connecting flange is constructed with a connecting flange wall going out radially from a duct flange wall lying in the plane of a duct wall, and with a supporting flange wall adjacent thereto and extending obliquely to the duct wall in various shapes.

With known air duct sections of this type, the supporting flange walls of the connecting flanges, form fitted in one piece, are fastened on the outside of the duct walls by spot welding. This additional procedure not only increases the cost of manufacturing but, in addition, the spot welded points are also susceptible to corrosion and must, preferably, be coated with an anti-corrosive agent. Moreover, the attained fixing of the supporting flange wall is only at these points and, thus, not uniformly secure over the entire length of the profile.

Furthermore, air duct sections with flange profiles are known which have only one flange projecting at right angles from the duct wall, the outer edge of said flange is bent back at right angles parallel to the duct wall. The opposite bent back edges are pressed together by a profile clamp which is to be slipped on. Of course, with this specific embodiment, one does not have to spot weld, however, the slipping on of the profile clamp onto the bent back edges is extremely troublesome, in particular, then when the bent back edges are easily damaged during transportation and at the construction site, which occurs very frequently. Moreover, the stability of air ducts having connection flanges of this type is unsatisfactory, since the canted flanges at the ends of the air duct sections do not offer an adequate stiffening. Problems also arise during assembly if there is insufficient room for slipping on the profile clamps.

SUMMARY OF THE INVENTION

It is an object of the invention to provide an air duct section of the above mentioned type that is improved in such a way that maximum stability of the connecting flanges results at the most inexpensive manufacturing cost while avoiding points susceptible to corrosion, such as spot welding or rivetting.

This object is obtained in accordance with the invention by an air duct section made of flat sheet metal duct walls by the end of each duct wall being bent to form a connecting flange, the connecting flange having an at least partially hollow closed profile. Arms of corner elbows are insertible into the open-ended profile at the corners of the air duct section whereby a screw connection can be made with an adjacent air duct section. A rim section bears a free edge of each connecting flange, and extends transverse to the longitudinal direction of the air duct section and is connected with the related duct wall by means of a continuous folded seam.

By lock-seaming the rim section of the connecting flange into the folding pocket, the connection flange formed by bending up the end of the duct wall forms a hollow closed profile having maximum stability. Because it is in one piece with the duct wall, no sealing problems, in particular, occur between connecting flange and duct wall. The flange wall connected with the duct section by said lock-seam is stayed along its entire length at the duct wall. No danger whatsoever of corrosion exists as a result of spot welded points, rivetting or the like. Since the required lock-seaming can be fabricated in the same procedure as the connecting flange itself, an additional procedure for fastening the connecting flange is omitted. Only the procedure of profiling takes a little longer. In return, however, the entire machinery for other fastening techniques falls away.

The required lock-seaming is expediently done in such a way that a folding pocket is formed directly between the duct wall and the adjoining flange wall of the connecting flange over or into which the bent rim section of the connecting flange is placed. Due to the rolling against each other of the sheet metal surfaces, a sufficient rigidity of the lock-seam joint is thus attained, both for compressive loads and tensile loads of the supporting flange wall or the duct flange wall, respectively. Preferably, the folding pocket is thereby drawn outward from the duct wall, since the inner surface of the duct remains essentially smooth.

In order to attain an even greater rigidity of the lock-seam joint also against compressive loads of the lock-seamed flange wall, further embodiments of this invention show several means for increasing the rigidity of the connecting flange and its folded seam. For example, drawing the folding pocket into the duct interior from the duct wall or forming a folding pocket pointing in different directions than pointing away from the connecting wall parallel to the duct wall can be done. For obtaining a rigid lock seam, the bent rim section is lock-seamed into the folding pocket at an angle of at least 90° with the flange wall bearing the rim section. In a further embodiment the folding pocket may be formed to show a curved cross section with a corresponding curved cross section of the rim section.

In particular, with larger air ducts of this type, for example, having duct widths of more than 1.5 m, it is, on the one hand, due to the compressive load produced by the sealings and, on the other hand, due to the adjustment of such sheet metal parts, which can no longer be accurately controlled over greater lengths, mostly necessary to also hold the connecting flanges together at points between the fixed corner connections by so-called intermediate connectors. With prior art ducts, use of intermediate connectors is easily possible with prior art welded or rivetted connecting flanges in that intermediate connectors are placed into the free edges of opposite connecting flanges at points situated between the welding spots or rivets. Due to the continuous lock-seaming of the edge of the connecting flange, this is no longer possible with the embodiments according to the invention. This difficulty is, however, solved by a protrusion which is very easily form fitted during connecting flange fabrication. The protrusion extends outward from the supporting flange wall. A brace for adjusting the flange can then be press fitted onto opposing protrusions of two adjacent connecting flanges at a central point between two duct corners. Moreover, opposing protrusions can also serve to more easily fasten the corner elbows in the connecting flanges in that the corner elbows have lugs which fit into the protrusions.

An essentially triangular hollow profile, having a supporting flange wall bent back inclined to the duct wall, is preferred. The inclined supporting flange wall can thereby proceed from the outer edge or from a point situated further inside the connecting flange wall extending at right angles to the duct wall. However, the supporting flange wall can also be led back to the duct wall in any other expedient form or inclination.

In particular, it is possible that, at first, an outwardly inclined supporting flange wall of the hollow profile and, subsequent to that, the remaining flange walls of said hollow profile are bent up adjoining to the end of the duct wall, whereby a duct flange wall bearing the free edge of the connecting flange ultimately comes to lie as continuation of the duct wall in its plane. The free edge of the connecting flange, arranged in this case at the duct flange wall, can then be lock-seamed in the same manner into the folding pocket which is formed between the end of the duct wall and the adjoining supporting flange wall.

Of course, the invention can be applied not only to one-piece air duct sections, made by canting, but also to such air duct sections which are composed of individual, flat sheets with bent up connecting flanges or of parts which each comprise two duct walls. In this case, care must simply be taken that either the corner fold between two duct walls to be joined are shortened so far that the profile rolls for manufacturing and lock-seaming the connecting flange have a continuous run without damaging the folding seam. In this case, the corner fold is, first of all, profile fitted and only then is the connecting flange made and lock-seamed. Leaks resulting from the shortened corner folding seam at the duct corners can be bridged by special corner angles or sealed with a sealing agent.

Instead of that, the connecting flanges can also be shortened so far that the profile rolls can run through unhindered onto the corner fold. In this case, the connecting flanges are first of all profile fitted and then the corner fold. Since the connecting flanges are somewhat shortened thereby, the corner elbows must have correspondingly longer arms.

Advantageous embodiments of the invention are placed under protection in further subclaims.

BRIEF DESCRIPTION OF THE DRAWINGS

Embodiments of the invention are explained in greater detail with reference to the drawings, showing.

The same reference numbers are used in all drawings for the same or corresponding parts.

DESCRIPTION OF THE PREFERRED EMBODIMENT

With the embodiment shown in FIGS. 1 to 4, a connecting flange 12, having an essentially triangular closed profile, is formed by bending up each of the ends of the duct walls 10 of an air duct section consisting of flat sheet metal. One first wall or duct flange wall 11 lying in the plane of the duct wall 10, connecting one flange wall 17, at right angles to the duct wall 10, and one supporting flange wall 14 extending obliquely to the duct wall 10, are thereby provided in each case. Corner elbows, generally designated with 20, comprise arms 16, 18 enclosing a right angle which are inserted into the profile, open at the corners, of the connecting flange 12. Each of the corner elbows 20 have in their apex a screw opening 22 for inserting screw bolts 24, onto which nuts 26 are threaded in such a way that adjacent connecting flanges 12 are secured in the corner areas of the air duct sections. Sealings 28 are thereby inserted between the adjacent connecting flanges 12 (see FIGS. 3 and 4).

Figure 1:
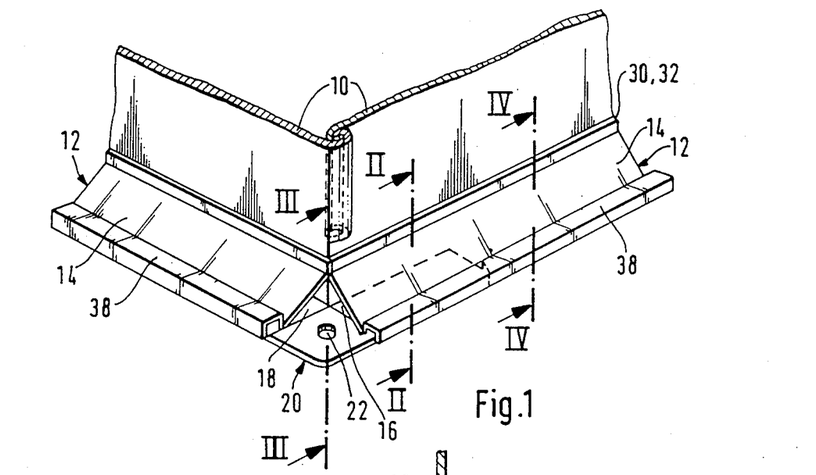
FIG. 1 a partial oblique view of the end of an air duct section according to the invention.
Figure 2:
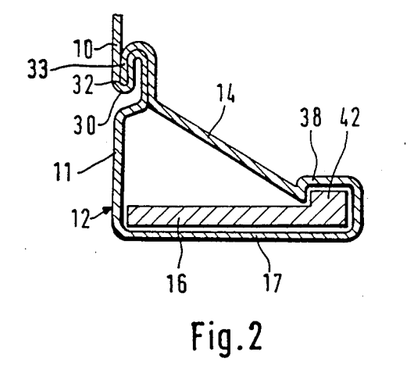
FIG. 2 a section along the line II—II in FIG. 1.
Figure 3:
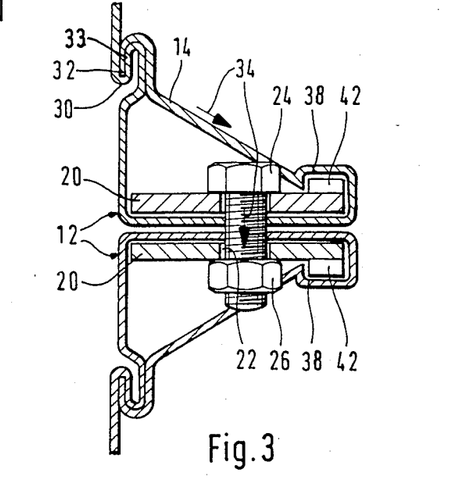
FIG. 3 a section along the line III—III in FIG. 1.
Figure 4:
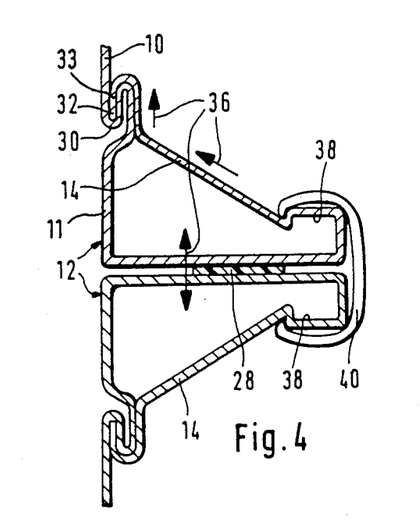
FIG. 4 a section along the line IV—IV in FIG. 1.

As shown in FIGS. 2 to 4, a folding pocket 30 is drawn outward between the duct wall 10 and the first wall or duct flange wall 11 lying in the same plane which folding pocket 30 is connecting the duct wall 10 with the first wall or duct flange wall 11, said folding pocket 30 pointing away from the connecting flange 12. Adjacent to the free edge 32 of the supporting flange wall 14 of each connecting flange 12 there is a rim section 33 bent in a hook-like manner in profile is placed into this folding pocket 30 and then fastened by rolling against one another of the rabbetted parts to form a lock seam.

The arrows 34 in FIG. 3 show that the supporting flange wall 14 is tensile loaded in the corner area as a result of being screwed with the screw bolts 24. Folded seam 30, 33 offers an excellent resistance to this tensile load.

The arrows 36 in FIG. 4 reveal that a compressive load, although smaller, is exerted onto the supporting flange wall 14 in a central area between two corner connections, according to FIG. 3, by the inserted sealings 28. With a good tightening of folded seam 30, 33 this supporting arm easily withstands the occurring compressive forces.

In the section furthest away from the duct wall 10, in this embodiment, each supporting flange wall 14 has a protrusion 38, which is almost rectangular in profile, extending outward almost parallel to the duct wall 10. As can be seen in FIG. 4, a brace 40, effecting the adjustment of the connecting flanges in a central area between the corner elbows 20, can be press fitted onto the protrusions 38 of the adjacent connecting flanges 12.

As can be seen, in particular, in FIGS. 2 and 3, the arms 16, 18 have lugs 42, at right angles in the cross-section, along an edge, each of said lugs fitting into a protrusion 38 and thus serving to facilitate the fixing of the corner elbows 20 prior to screwing down the nuts 26.

Figure 5:
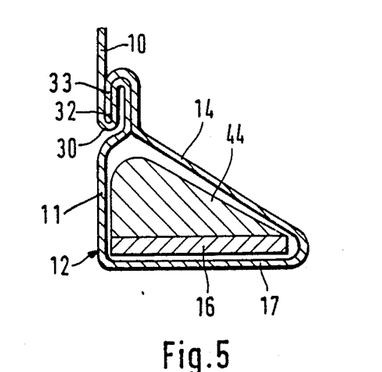
FIGS. 5 to 18 sections corresponding to FIG. 2 through other embodiments of the invention.

The embodiment shown in FIG. 5 is different from the thus far described embodiments only in that the protrusion 38 is missing. This embodiment is quite sufficient for many uses, in particular, with smaller duct cross-sections. In this case, the arms 16 of the corner elbows 20 have lugs 44, which extend over their entire surface, having almost a triangular cross-section, said lugs fitting into the connecting flanges 12 so that the corner elbows are held.

Figure 6:
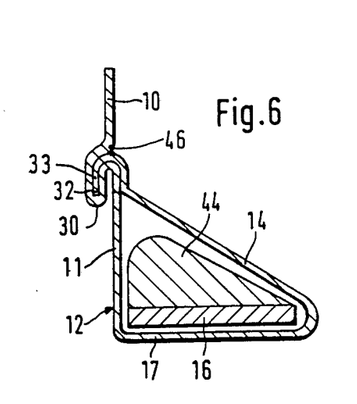
Figure 7:
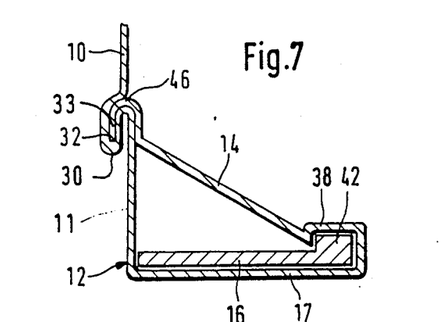

In FIGS. 6 and 7, two embodiments are provided with folding pockets 30, which are drawn from the duct wall 10 into the duct interior and point away from the connecting flange 12, the rim section 33 of the supporting flange wall 14, bent in a hook-like manner in profile, lock-seamed into said folding pocket 30. In this embodiment, the lock-seam joint 30, 33 can absorb the compression 36, occurring in accordance with FIG. 4, as well as the tension 34, occurring in accordance with FIG. 3. Rim section 32 is also satisfactorily held when strong compressions 36 occur by part 46 of the folding pocket 30, which is adjacent to the hook-shaped ring section 32 and points outward.

Otherwise, FIG. 7 corresponds to the embodiment according to FIG. 2 with respect to the construction of protrusion 38 and lug 42, and FIG. 6 to the embodiment according to FIG. 5 with respect to the missing protrusion and lug 42.

Figure 8:
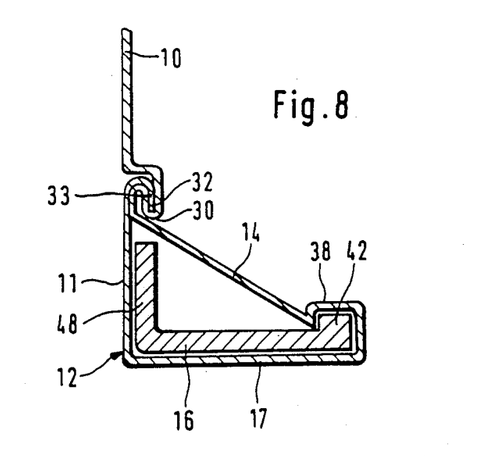

In the embodiment according to FIG. 8, after forming a folding pocket 30, arranged outside the duct wall plane and pointing away from the connecting flange 12, the end of the duct wall 10 firstly is bent to form a supporting flange wall 14', then the protrusion 38 and the connecting flange wall 17, projecting at right angles from the duct wall 10, and lastly a duct flange wall 11' which is parallel to the duct wall 10 and is bearing the free edge 32, forms the conclusion. A rim section 33 of the duct flange wall 11', which is bent outward in a hook-like manner in profile, is lock-seamed from the inside into the folding pocket 30. This embodiment also results in a very good staying of the connecting flange 12, since, for example, compressive loads, occurring in the supporting flange wall 14, are absorbed directly by the duct wall 10. The arms 16 of the corner elbows 20 have, in this embodiment, in addition to the lugs 42, for an even better fastening, angular lugs 48 adjacent to the duct flange wall 11.

Figure 9:
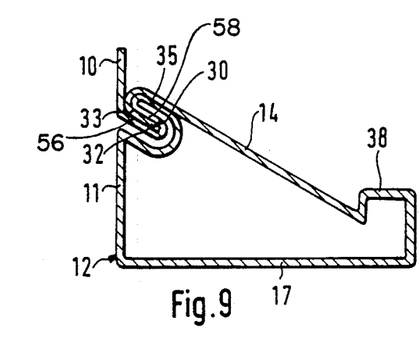

FIG. 9 shows an embodiment whose folding pocket 30 is extending obliquely to the duct wall 10 but still pointing away from the connecting flange 12. The folding pocket 30 includes a first side 56 depending from the duct wall portion 10 and a second side 58 including a free end 35.

Figure 10:
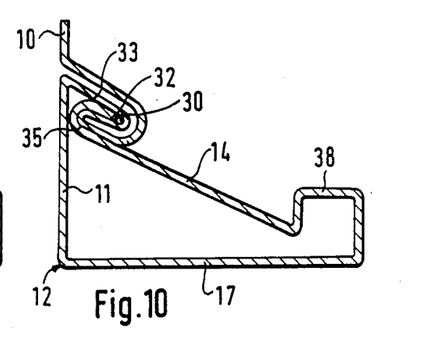

In FIG. 10 the pocket 30 extending in the same direction as in FIG. 9 but the rim section 33 is hooked-in from below in contrast to FIG. 9 where it is hooked-in from above. This is obtained by bending the nose (or free end) 35 forming the folding pocket 30 in opposite directions.

Figure 11:
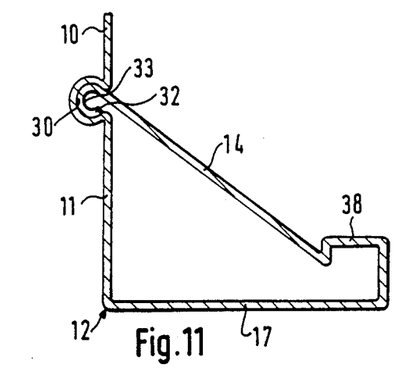

Another embodiment of the invention is shown in FIG. 11 whereby the pocket 30 and the rim section 33 have an approximately cylindrically curved cross section. Of course, after rolling flat this lock-seam the cross section is also flattened to hold fast. However, the general direction of the seam pocket in this case is about perpendicular to the duct wall 10. The essential feature for fastening the rim section 33 in the folded seam is to be seen in the fact that the rim section is bent over more than 90° in regard of the adjoining flange wall, in this case the supporting flange wall 14.

Figure 12:
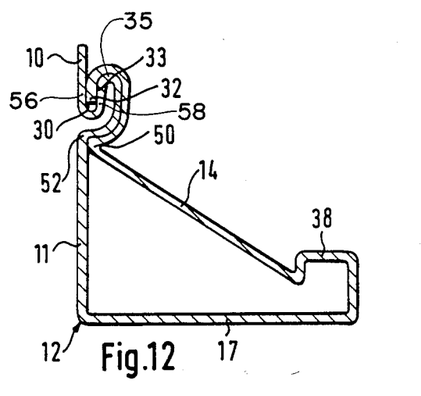

In the embodiment of FIG. 12 there is provided a nose 50 in the supporting flange wall 14 which nose 50 is fitted into the concave groove 52 formed between the duct flange wall 11 and the sheet metal surface forming the folding pocket 30. Thereby, compressive loads in the supporting flange wall 14 will be taken off the folded seam 30, 33. The same is true of course with the folded seam 30, 33 in the embodiment of FIG. 11.

Figure 13:
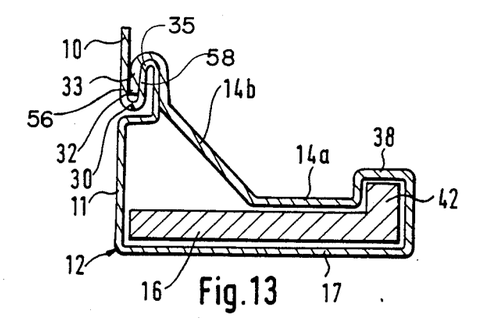

The embodiment of FIG. 13 shows an alternative form of the supporting flange wall which is comprised of two sections 14a and 14b of which the section 14a is extending parallel to the connecting flange wall 17 and only section 14b forms the actual supporting part. In this embodiment, the folding pocket can be located outside the duct wall plane or in the duct wall plane.

Figure 14:
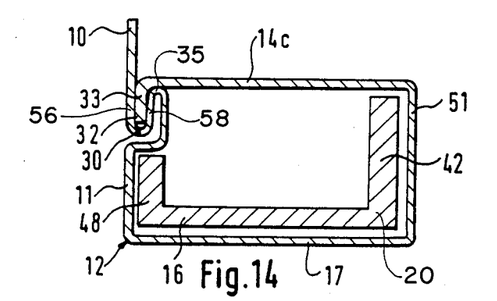

A further alternative is shown in FIG. 14, whereby the whole supporting flange wall 14c is extending parallel to the connecting flange wall 17 and between these two flange walls is inserted a fourth flange wall or riser wall 51 extending parallel to the duct flange wall 11. The rim section 33 being bent such that it encloses 90° with the supporting flange wall 14c, a good resistance against tensile and compressive forces in the supporting flange wall 14c is obtained. In this case the lugs 42 and 48 of corner elbow 20 have to be adapted in length to the fourth flange riser wall 51 and to the duct flange wall 11 to obtain a good stiffening of the connecting flange 12. In this embodiment the folding pocket can be located either outside the duct wall plane or in the duct wall plane.

Figure 15:
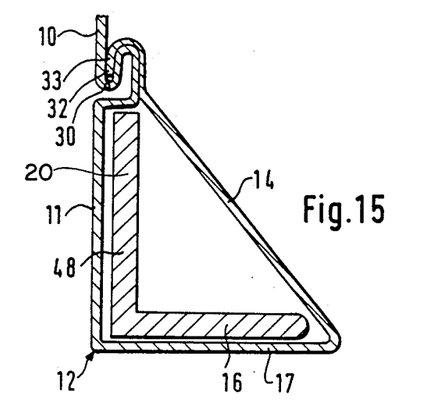

A further embodiment with a rather long supporting flange wall 14 and corner elbow 20 having lug portion 16 and lug 48 is shown in FIG. 15. This embodiment is especially advantageous for taking up great tensile forces in the supporting flange wall 14. In this embodiment the folding pocket can be located either outside the duct wall plane or in the duct wall plane.

Figure 16:
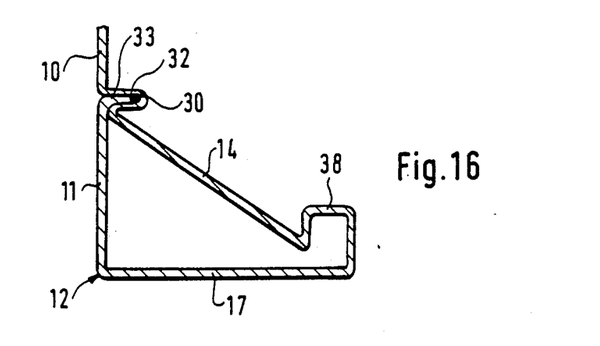
Figure 17:
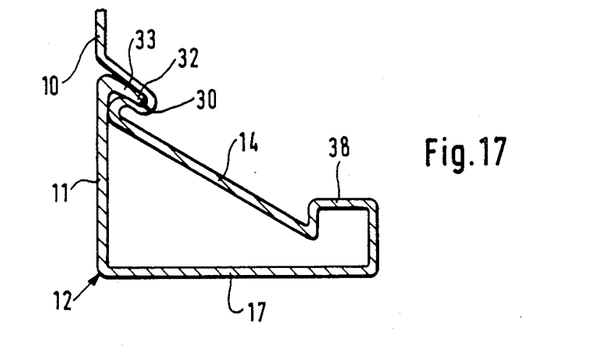
Figure 18:
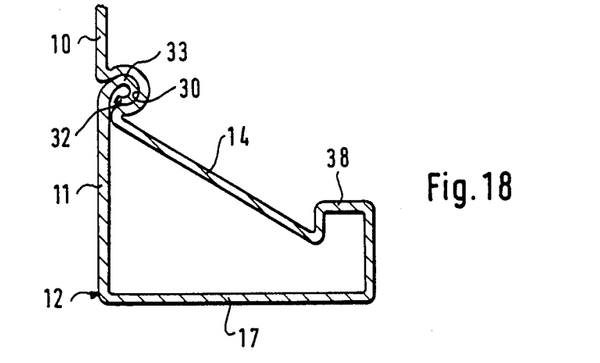

The remaining embodiments of FIG. 16 to 18 are similar to the embodiment of FIG. 8 in as far as they show the supporting flange wall 14 connected in one piece with the folding pocket 30, and the duct flange wall 11 ending in the hook-like bended rim section 33 bearing free edge 32. FIG. 16 shows the folding pocket 30 extending approximately perpendicular to the duct wall 10 in the rim section 33 enclosing an angle of 90° with the duct flange wall 11. In FIG. 17 the folding pocket 30 extends obliquely like in the embodiments of FIGS. 9 and 10 but is formed between the duct wall 10 and the supporting flange wall 14. The rim section 33 is bent up to more than 90°.

An embodiment comparable to the embodiment of FIG. 11 is shown in FIG. 18 but here the folding pocket 30 is also formed between the duct wall 10 and the supporting flange wall 14. Also in this case folding pocket 30 and rim section 33 will be flattened by rolling flat the lock-seam built between the parts 30 and 33.

In the embodiments shown in FIGS. 16-18, the folding pocket 30 can be located outside the duct wall plane or in the duct wall plane.

I claim:

1. An air duct section made of a flat sheet metal duct wall the end of which duct wall being bent to form a connecting flange, said connecting flange having an at least partially hollow closed profile, the arms of corner elbows being insertible into said open-ended profile at the corner of the air duct section whereby a screw connection can be made with an adjacent air duct section, a rim section bearing a free edge of each connecting flange, extending transverse to the longitudinal direction of the air duct section, being connected with the related duct wall by means of a continuous folded seam.

2. An air duct section made of a flat sheet metal duct wall the end of which duct wall being bent to form a connecting flange, said connecting flange having an at least partially hollow closed profile, the arms of corner elbows being insertable into said open-ended profile at the corner of the air duct section whereby a screw connection can be made with an adjacent air duct section, a rim section bearing a free edge of each connecting flange, extending transverse to the longitudinal direction of the air duct section, being connected with the related duct wall by means of a continuous folded seam, wherein the connecting flange comprises a duct flange wall lying in the plane of the duct wall, a connecting flange wall adjacent to the duct flange wall connecting a radially outer end of said connecting flange wall with said duct wall and extending at least partially obliquely to the channel wall.

3. An air duct section according to claim 2, wherein said duct wall and said duct flange wall are adjoined in one piece and form together a folding pocket in which the rim section of the supporting flange wall is lock-seamed.

4. An air duct section according to claim 2, wherein said duct wall and said supporting flange wall are adjoined in one piece and form together a folding pocket in which the rim section of the duct flange wall is lock-seamed.

5. An air duct section made of flat sheet metal, said duct section including a duct wall portion located in a duct wall plane and a connecting flange portion form fitted in one piece, said connecting flange portion located at the end of the said duct wall portion, said connecting flange portion having an at least partially hollow profile and including a duct flange wall extending from said duct wall portion, a flange wall extending from said duct flange wall away from said duct flange wall, and a supporting wall extending from said flange wall to said duct wall portion, said supporting wall including a rim and a free edge being connected with said duct wall portion by means of a continuous folded seam, said air duct section further including a folding pocket comprised of a first side depending from said duct wall portion and a second side comprised of a free end, said folding pocket receiving the rim and the free edge of the supporting wall, said rim bent in a hook-like manner in profile.

6. An air duct section according to claim 5, wherein said flange wall includes a hole for receiving a screw for fastening the air duct section to another air duct section.

7. An air duct section according to claim 5, further including a corner elbow having a shape that fits into said hollow profile of said connecting flange portion.

8. An air duct section made of flat sheet metal, said duct section including a duct wall portion located in a duct wall plane and a connecting flange portion form fitted in one piece, said connecting flange portion located at the end of the said duct wall portion, said connecting flange portion having an at least partially hollow profile and including a supporting wall extending from said duct wall portion, a flange wall extending from said supporting wall away from said supporting wall, and a duct flange wall extending from said flange wall to said duct wall portion, said duct flange wall including a rim and a free edge being connected with said duct wall portion by means of a continuous folded seam, said air duct section further including a folding pocket comprised of a first side depending from said duct wall portion and a second side comprised of a free end, said folding pocket receiving the rim and the free edge of the duct flange wall, said rim bent in a hook-like manner in profile.

9. An air duct section according to claim 8, wherein said flange wall includes a hole for receiving a screw for fastening the air duct section to another air duct section.

10. An air duct section according to claim 8, further including a corner elbow having a shape that fits into said hollow profile of said connecting flange portion.

11. An air duct section made of flat sheet metal, said duct section including a duct wall portion located in a duct wall plane and a connecting flange portion form fitted in one piece, said connecting flange portion located at the end of said duct wall portion, said connecting flange portion having an at least partially hollow profile and including a first wall extending from said duct wall portion, a flange wall extending from said first wall away from said first wall, and a supporting wall extending from said flange wall to said duct wall portion, said supporting wall including a free edge being connected with said duct wall portion by means of a continuous folded seam, wherein a folding pocket, arranged outside the duct wall plane and pointing toward the connecting flange portion is formed by the duct wall portion, the free edge of the supporting wall, bent in a hook-like manner in profile, being disposed over said folding pocket.

12. An air duct section made of flat sheet metal, said duct section including a duct wall portion located in a duct wall plane and a connecting flange portion form fitted in one piece, said connecting flange portion located at the end of said duct wall portion, said connecting flange portion having an at least partially hollow profile and including a duct flange wall extending from said duct wall portion, a flange wall extending from said duct flange wall away from said duct flange wall, and a supporting wall extending from said flange wall to said duct wall portion, said supporting wall including a free edge being connected with said duct wall portion by means of a continuous folded seam, said air duct section further including a folding pocket, comprised of a first side depending from said duct wall portion and a second side comprised of a free end, said folding pocket arranged outside the duct wall plane, said folding pocket pointing away from the connecting flange portion and oriented obliquely with respect to said duct wall portion, said folding pocket receiving the free edge of the supporting wall, said free edge bent in a hook-like manner in profile.

13. An air duct section according to claim 12, wherein said second side of said pocket is located above said free edge of said supporting wall.

14. An air duct section according to claim 12, wherein said second side of said pocket is located below said free edge of said supporting wall.

15. An air duct section made of flat sheet metal, said duct section including a duct wall portion located in a duct wall plane and a connecting flange portion form fitted in one piece, said connecting flange portion located at the end of said duct wall portion, said connecting flange portion having an at least partially hollow profile and including a duct flange wall extending from said duct wall portion, a flange wall extending from said duct flange wall away from said duct flange wall, and a supporting wall extending from said flange wall to said duct wall portion, said supporting wall including a free edge being connected with said duct wall portion by means of a continuous folded seam, wherein a circular folding pocket, arranged outside the duct wall plane and facing in an orientation toward the duct wall plane and substantially parallel to the connecting flange portion, is formed by the duct wall portion, the free edge of the supporting wall, bent in a circular manner in profile, being disposed in said circular folding pocket.

16. An air duct section made of flat sheet metal, said duct section including a duct wall portion located in a duct wall plane and a connecting flange portion form fitted in one piece, said connecting flange portion located at the end of said duct wall portion, said connecting flange portion having an at least partially hollow profile and including a duct flange wall extending from said duct wall portion, a flange wall extending from said duct flange wall away from said duct flange wall, and a supporting wall extending from said flange wall to said duct wall portion, said supporting wall including a free edge being connected with said duct wall portion by means of a continuous folded seam, said air duct section further including a folding pocket, comprised of a first side depending from said duct wall portion and a second side comprised of a free end, said folding pocket located above a concave fold between said folding pocket and said supporting wall, said folding pocket forming a nose-like profile whereby compressive loads from said supporting wall are reduced in said folded seam, said folding pocket receiving the free edge of the supporting wall, said free edge bent in a hook-like manner in profile.

17. An air duct section made of flat sheet metal, said duct section including a duct wall portion located in a duct wall plane and a connecting flange portion form fitted in one piece, said connecting flange portion located at the end of the said duct wall portion, said connecting flange portion having an at least partially hollow profile and including a duct flange wall extending from said duct wall portion, a flange wall extending from said duct flange wall away from said duct flange wall, and a supporting wall extending from said flange wall to said duct wall portion, said supporting wall having a portion substantially oblique with respect to said duct wall portion and having a portion substantially parallel to said connecting flange portion, said supporting wall including a free edge being connected with said duct wall portion by means of a continuous folded seam, said duct wall section also including a folding pocket comprised of a first side depending from said duct wall portion and a second side comprised of a free end, said folding pocket receiving the free edge of the supporting wall, said free edge bent in a hook-like manner in profile.

18. An air duct section according to claim 17, wherein said folding pocket is arranged outside the duct wall plane.

19. An air duct section according to claim 17, wherein said folding pocket is arranged within the duct wall plane.

20. An air duct section made of flat sheet metal, said duct section including a duct wall portion located in a duct wall plane and a connecting flange portion form fitted in one piece, said connecting flange portion located at the end of said duct wall portion, said connecting flange portion having an at least partially hollow profile and including a duct flange wall extending from said duct wall portion, a flange wall extending from said duct flange wall away from said duct flange wall, and a supporting wall extending from said flange wall to said duct wall portion, said supporting wall substantially parallel to said flange wall and depending from a riser wall connected to said flange wall, said supporting wall including a free edge being connected with said duct wall portion by means of a continuous folded seam, said duct wall section also including a folding pocket comprised of a first side depending from said duct wall portion and a second side comprised of a free end, said folding pocket receiving the free edge of the supporting wall, said free edge bent in a hook-like manner in profile.

21. An air duct section according to claim 20 further including a corner elbow which fits in the hollow profile of the duct section, said corner elbow including a first lug portion adjacent to said folding pocket and extending along said duct flange wall, a second lug portion extending from said first lug portion adjacent to said flange wall, and a third lug portion extending from said second lug portion along said riser wall.

22. An air duct section according to claim 20, wherein said folding pocket is arranged outside the duct wall plane.

23. An air duct section according to claim 20, wherein said folding pocket is arranged with the duct wall plane.

24. An air duct section made of flat sheet metal, said duct section including a duct wall portion located in a duct wall plane and a connecting flange portion form fitted in one piece, said connecting flange portion located at the end of the said duct wall portion, said connecting flange portion having an at least partially hollow profile and including a duct flange wall extending from said duct wall portion, a flange wall extending from said duct flange wall away from said duct flange wall, and a supporting wall extending from said flange wall to said duct wall portion, said supporting wall having a portion substantially oblique with respect to said duct wall portion, said supporting wall including a free edge being connected with said duct wall portion by means of a continuous folded seam, said duct wall section also including a folding pocket comprised of a first side depending from said duct wall portion and a second side comprised of a free end, said folding pocket receiving the free edge of the supporting wall, said free edge bent in a hook-like manner in profile.

25. An air duct section according to claim 24 further including a corner elbow which fits in the hollow profile of the duct section, said corner elbow including a lug first portion adjacent to said folding pocket and extending along said duct flange wall and including a second lug portion extending from said first lug portion along said flange wall.

26. An air duct section according to claim 24, wherein said folding pocket is arranged outside the duct wall plane.

27. An air duct section according to claim 24, wherein said folding pocket is arranged with the duct wall plane.

28. An air duct section made of flat sheet metal, said duct section including a duct wall portion located in a duct wall plane and connecting flange portion form fitted in one piece, said connecting flange portion located at the end of said duct wall portion, said connecting flange portion having an at least partially hollow profile and including a supporting wall extending from said duct wall portion, a flange wall extending from said supporting wall toward the duct wall plane, and a duct flange wall extending from said flange wall to said duct wall portion, said duct flange wall including a free edge being connected with said duct wall portion by means of a continuous folded seam, wherein a folding pocket is formed by the duct wall portion, the free edge of said duct flange wall being bent in a manner complementary in profile to said folding pocket and being disposed in said folding pocket.

29. An air duct section according to claim 28, wherein said folding pocket points toward said duct wall plane and is substantially parallel to said connecting flange wall.

30. An air duct section according to claim 28, said folding pocket is oriented obliquely with respect to said duct wall portion.

31. An air duct section according to claim 28, wherein said folding pocket is circular and wherein said free edge of said duct flange wall is bent in a circular form that fits inside said circular folding pocket.

32. An air duct section according to claim 28, wherein said folding pocket is arranged outside the duct wall plane.

33. An air duct section according to claim 28, wherein said folding pocket is arranged in the duct wall plane.

34. A pair of air duct sections, comprising:
a first air duct section according to claims 1, 5, 12, 16, 17, 20, 24, or 28,
a first supporting arm being insertible into a first connecting flange portion of said first air duct section at the corner thereof, said first supporting arm leading back to said first wall and adjacent to said flange wall,
an adjacent second air duct section according to claims 1, 5, 12, 16, 17, 20, 24 or 28,
a screw connection connecting a first connecting flange portion with an adjacent second connecting flange portion of said second duct section, said screw connection extending through the first supporting arm in the first connecting flange portion at a corner thereof and through the second supporting arm in the adjacent second connecting flange portion at a corner thereof of an adjacent second duct section.

35. A pair of air duct sections according to claim 34, in which at least one supporting arm has a lug which fits into the hollow profile.

36. A pair of air duct sections according to claim 34, in which at least one supporting wall has an outwardly extending, continuous protrusion in its part which is furthest away from the duct wall plane.

37. A pair of air duct sections according to claim 36, in which at least one supporting arm has a lug which fits into the protrusion in the supporting wall.

38. A pair of air duct sections according to claim 36, in which at least one supporting arm has a angular section parallel to a duct wall portion.

39. A pair of air duct sections according to claim 34, in which at least one hollow profile of the connecting flange portion is essentially triangular and the supporting wall is bent back and inclined to the duct wall portion.

40. An air duct section made of flat sheet metal, said duct section including a duct wall portion located in a duct wall plane and connecting flange portion form fitted in one piece, said connecting flange portion located at the end of the said duct wall portion, said connecting flange portion having an at least partially hollow profile and including a duct flange wall extending from said duct wall portion, a flange wall extending from said duct flange wall away from said duct flange wall, and supporting wall extending from said flange wall to said duct wall portion, said supporting wall including a rim and a free edge being connected with said duct wall portion by means of a continuous folded seam, said air duct section further including a folding pocket comprised of a first side depending from said duct wall portion and a second side substantially parallel to said first side, said folding pocket receiving the rim and the free edge of the supporting wall, said rim bent in hool-like manner in profile, the supporting wall having an outwardly extending, continuous protrusion in its part which is furtherst away from the duct wall plane, a lug portion fitting in the hollow profile extending along the flange wall and fitting into the protrusion in the supporting wall.

* * * * *